United States Patent [19]

Britton, Jr. et al.

[11] Patent Number: 5,225,682

[45] Date of Patent: Jul. 6, 1993

[54] METHOD AND APPARATUS FOR PROVIDING PULSE PILE-UP CORRECTION IN CHARGE QUANTIZING RADIATION DETECTION SYSTEMS

[75] Inventors: Charles L. Britton, Jr., Alcoa; Alan L. Wintenberg, Knoxville, both of Tenn.

[73] Assignee: The United States of America as represented by the United States Department of Energy, Washington, D.C.

[21] Appl. No.: 825,225

[22] Filed: Jan. 24, 1992

[51] Int. Cl.$^5$ .............................................. G01T 1/17
[52] U.S. Cl. ..................................... 250/395; 250/369
[58] Field of Search ......................... 250/395, 369, 262

[56] References Cited

U.S. PATENT DOCUMENTS 4,535,242 8/1985 Dirkse et al. ........................ 250/369

FOREIGN PATENT DOCUMENTS 0115081 5/1988 Japan .................................. 250/369

OTHER PUBLICATIONS

Sippach, F. W., "An Analog Pipeline for Zeus", Nuclear Instruments and Methods in Physics Research A265 (1988), 321-325.
Buttler, W., et al., "Design and Performance of a 10MHz CMOS Analog Pipeline", Nuclear Instruments and Methods in Physics Research A277 (1989) 217-221.
Souchek, Branko, "Application of Pile Up Distortions", The Review of Scientific Instruments, vol. 36, No. 11, Nov. 1965.
Wintenberg, A. L., et al., "Considerations on the Design of Frontend Electronics for Silicon Calorimetry for the SSC", Proceedings of Simposium on Detector Research & Development for the SSC, pp. 508-510, Oct. 15-18, 1990.

Primary Examiner—Paul M. Dzierzynski
Assistant Examiner—Richard Hanig
Attorney, Agent, or Firm—David E. Breeden; Stephen D. Hamel; William R. Moser

[57] ABSTRACT

A radiation detection method and system for continuously correcting the quantization of detected charge during pulse pile-up conditions. Charge pulses from a radiation detector responsive to the energy of detected radiation events are converted to voltage pulses of predetermined shape whose peak amplitudes are proportional to the quantity of charge of each corresponding detected event by means of a charge-sensitive preamplifier. These peak amplitudes are sampled and stored sequentially in accordance with their respective times of occurrence. Based on the stored peak amplitudes and times of occurrence, a correction factor is generated which represents the fraction of a previous pulses influence on a preceding pulse peak amplitude. This correction factor is subtracted from the following pulse amplitude in a summing amplifier whose output then represents the corrected charge quantity measurement.

8 Claims, 4 Drawing Sheets

METHOD AND APPARATUS FOR PROVIDING PULSE PILE-UP CORRECTION IN CHARGE QUANTIZING RADIATION DETECTION SYSTEMS

The United States Government has rights in this invention pursuant to Contract No. DE-AC05-84OR21400 with Martin Marietta Energy Systems, Inc., awarded by the U.S. Department of Energy.

BACKGROUND OF THE INVENTION

This invention relates generally to radiation detection devices and methods and more specifically to methods and apparatus for correcting pulse pile-up in charge quantizing radiation detection systems.

Radiation detection systems that quantize detected charges are excited by either synchronous or random input depending on the source of radiation. At low interaction rates, the time taken to process and reset from an event can be much shorter than the time between events. At higher interaction rates, the processor can still be responding to the first event when a second event arrives and is to be received. The processor output then depends upon the events in combination and causes inaccuracy in the measurement of the second event and is traditionally referred to as pulse "pile-up". Since the amplitude of the given pulse is random, the resultant error can be large or small. In the past pulse pile-up has been dealt with in various ways which primarily use post collection data correction or simply rejection of piled-up events. Therefore, it will be obvious that there is a need for a method and device for dynamically correcting the processor output levels representing the total charge collected so that the signal continuously reflects the true charge quantity of the detected radiation.

SUMMARY OF THE INVENTION

In view of the above need, it is an object of this invention to provide a radiation detection method for continuously quantizing detected charges during a pulse pile-up condition.

Further, it is an object of this invention to provide a radiation detection system for carrying out the method of the above object.

Yet another object of this invention is to provide a radiation detection method and system for continuously quantizing detected charges during pulse pile-up for either synchronous or non-synchronous radiation detection system.

Briefly, this invention is a radiation detection method and system for continuously correcting the quantization of detected charge during pulse pile-up conditions. In accordance with the invention, charge pulses from a radiation detector responsive to the energy of detected radiation events are converted to voltage pulses of predetermined shape whose peak amplitudes are proportional to the quantity of charge of each corresponding detected event by means of a charge-sensitive preamplifier. These peak amplitudes are sampled and stored sequentially in accordance with their respective times of occurrence. Based on the stored peak amplitudes and times of occurrence, a correction factor is generated which represents the fraction of a previous pulses influence on a preceding pulse peak amplitude. This correction factor is subtracted from the following pulse amplitude in a summing amplifier whose output then represents the corrected charge quantity measurement.

In accordance with one aspect of this invention for the detection of events which occur at regular time intervals, the peak amplitudes of the shaped pulses corresponding to each detected event are continually stored in an analog storage device. The correction factor is then generated by multiplying the previous stored peak value by a fixed fractional value (K) corresponding to the fixed time of occurrence between detected events and then subtracted from the subsequent pulse peak stored value to provide a corrected output. In this manner correction may be provided for multiple pulse pile-up.

In accordance with another aspect of this invention for the detection of events which occur asynchronously, means are provided for calculating the fractional value K as a function of the random time between events to correct for pulse pile-up in the output signal.

Additional objects, advantages and novel features of the invention will be set forth in part in the description which follows, and in part will become apparent to those skilled in the art upon examination of the following or may be learned by practice of the invention. The objects and advantages of the invention may be realized and attained by means of the methods, instrumentalities and combinations particularly pointed out in the appended claims.

BRIEF DESCRIPTION OF THE DRAWINGS

The accompanying drawings, which are incorporated in and form a part of the specification, illustrate preferred embodiments of the invention and, together with the description, serve to explain the principles of the invention.

DETAILED DESCRIPTION

Figure 1:
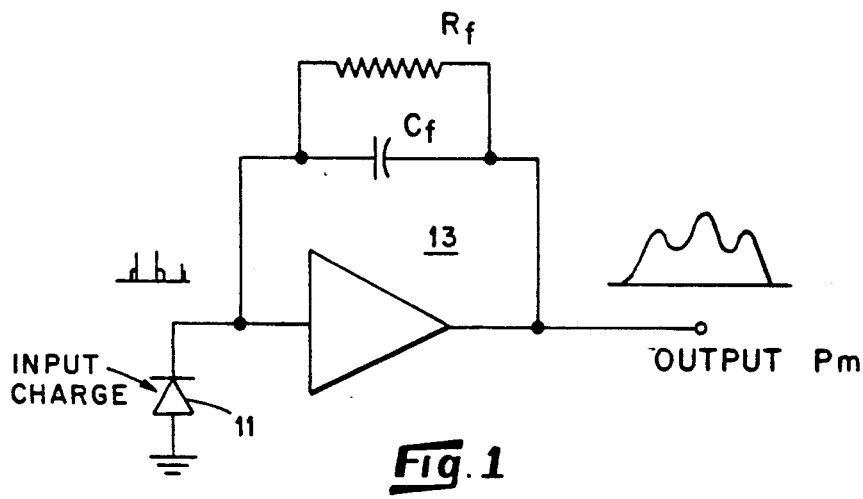
FIG. 1 is a schematic diagram illustrating a charge-sensitive preamplifier which may be used to provide the predetermined shaped voltage pulses in each of the embodiments described herein.
Figure 2:
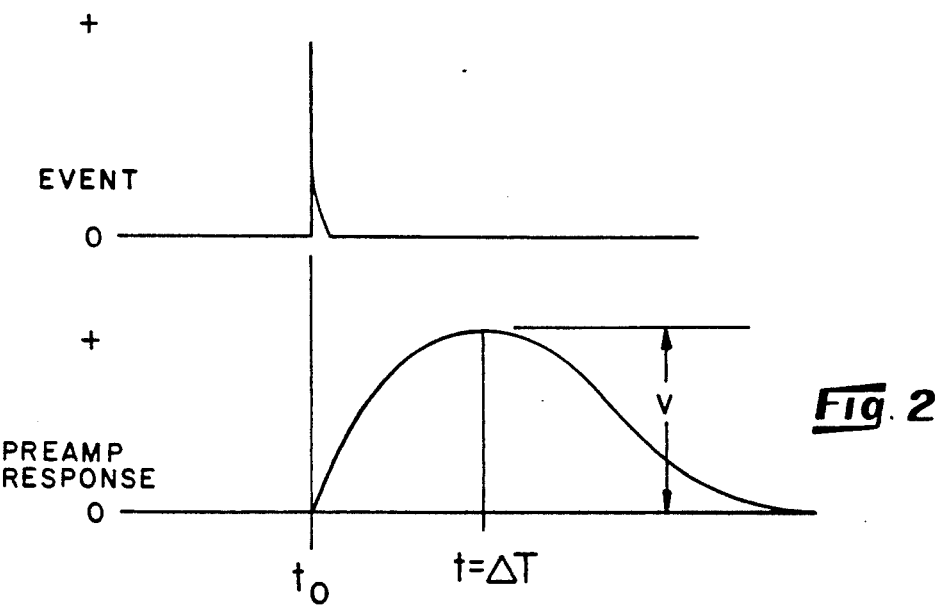
FIG. 2 is a timing diagram illustrating the predetermined pulse shape response of the preamplifier of FIG. 1 to a single radiation event signal from a radiation detector.
Figure 3:
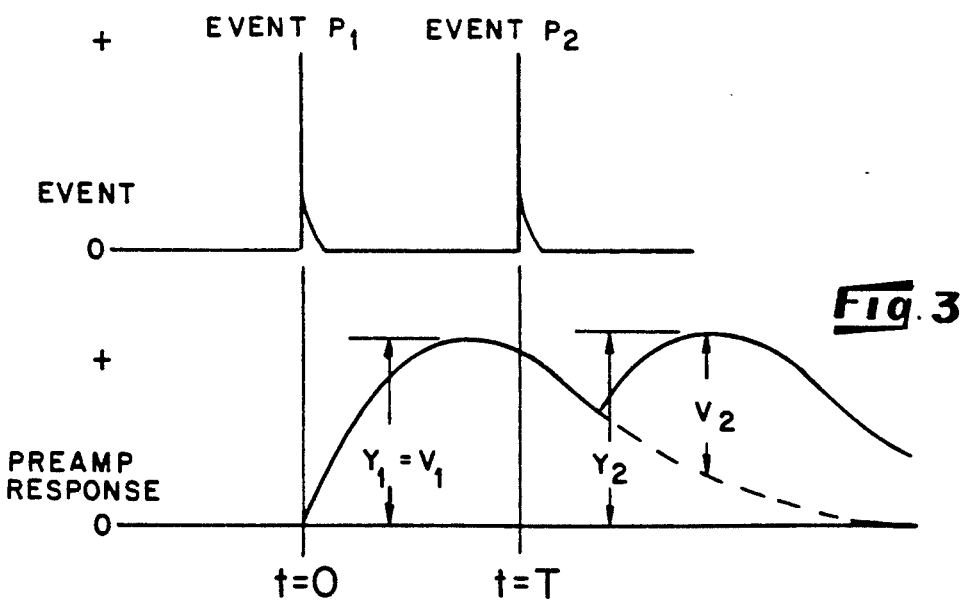
FIG. 3 is a timing diagram illustrating the preamplifier output during pulse pile-up due to two consecutive events.

As pointed out above, the pulse pile-up correction method of this invention may be employed in the detection of either synchronous or asynchronous radiation events depending on the source of radiation. One example of a source of synchronous radiation events is in a colliding beam experiment where the event rate is synchronized with a master clock. The detected events, whose charge is to be quantized, occur at regular intervals corresponding to the master clock period T. These events may be detected and the charge collected by various radiation detection means responsive to the energy level of the detected events. One example is shown in FIG. 1 wherein a solid state ionizing radiation detector 11, such as a silicon PIN diode, is connected to the input of a charge-sensitive preamplifier 13 which generates an output voltage signal proportional to the charge deposited by each detected event. Due to the time constant of the feedback components $R_f$ and $C_f$, the response to an event is longer than the event itself, as shown in FIG. 2. The quantity of interest is the peak amplitude V of the processed pulse which occurs some time T after the event time $t_o$. V is directly proportional to the deposited energy p of the detected event. The remainder of the pulse after time T is of no interest and only serves to disturb the measurement accuracy of subsequent pulses. As shown in FIG. 3, the first peak value $Y_1$ is equal to $V_1$ since there is no pile-up from events before $Y_1$ The measured quantity $Y_2$, however, has both the quantity of interest $V_2$ and the remaining response of $Y_1$ summed together. Since $Y_1$ and $Y_2$ can be measured, and the time response of the preamplifier can be determined, the fraction of pulse $Y_1$ still present at $Y_2$ can be calculated and subtracted from $Y_2$ to obtain the corrected second event peak voltage $V_2$. Thus, the corrected value $V_2$ is proportional to the energy $p_2$ of the second detected event. This technique can be further extended to correct for pile-up relating to more than two events, as will be explained herein below.

Figure 4:
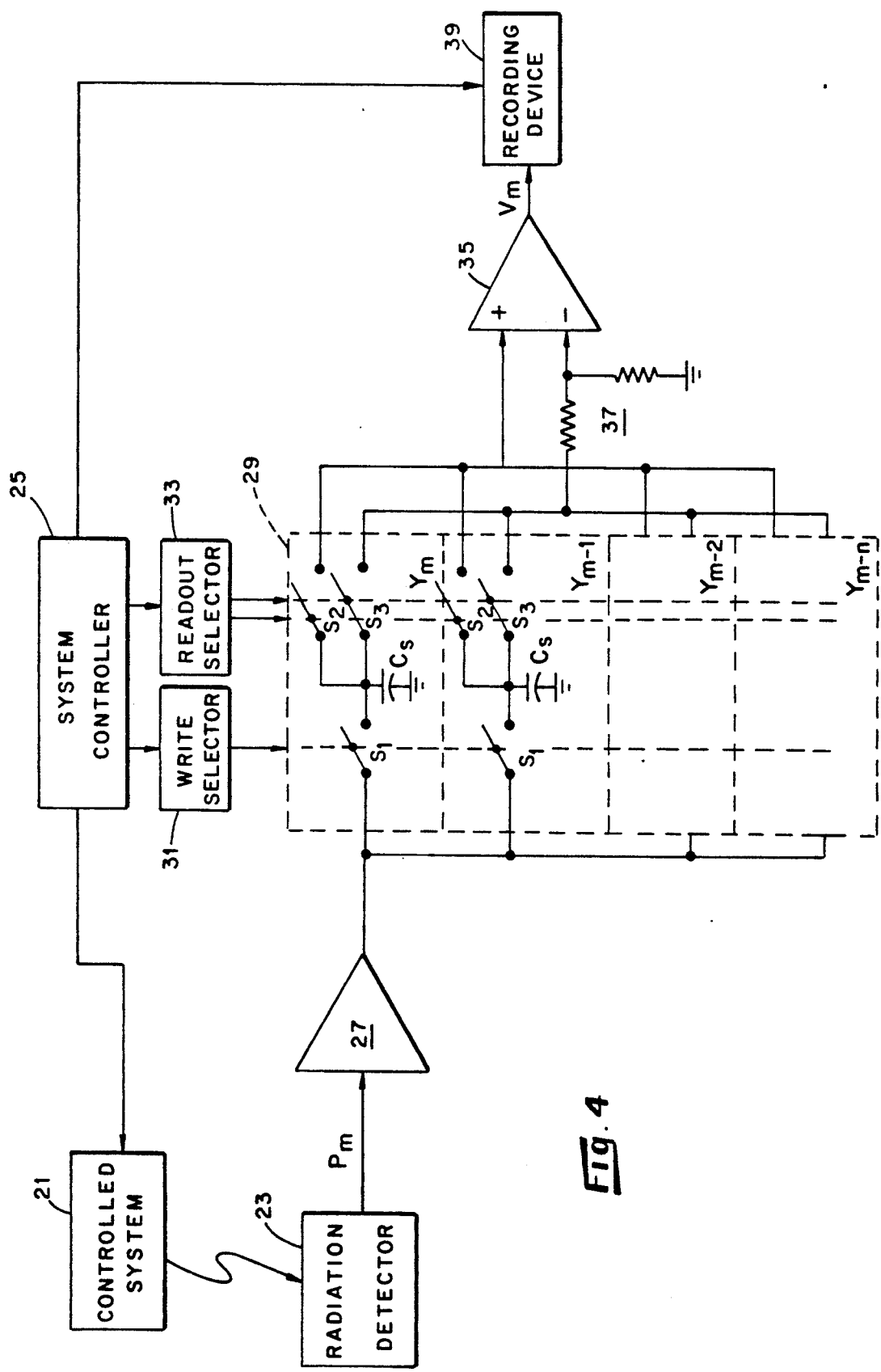
FIG. 4 is a block diagram of a pulse pile-up correction circuit according to the present invention for the detection of synchronous radiation events.

Referring now to FIG. 4, wherein there is shown a schematic of a radiation detection system according to the present invention for measuring synchronous radiation events from a controlled system 21, such as the Superconducting Super Collider, in which radiation events detected by a detector 23 are the result of timed events controlled by a master clock in a system controller 25. The detector pulses $P_m$ are fed to the input of a charge sensitive preamplifier 27 whose output is connected to the input of an analog storage pipeline 29. The pipeline 29 consists of n+1 capacitance storage segments, where n is typically in the range of from 50 to 500, depending on the application. The capacitance storage element $C_s$ of each segment is switched to store sampled signals $Y_m$ through $Y_{m-n}$, corresponding to the sequential signal peaks from the synchronous events, in sequence in the pipeline 29 by means of a write selector 31 controlled by the system controller 25. The write selector may take the form of a sequencer which sequentially activates separate outputs connected to control inputs of separate switches $S_1$ of the pipeline 29 segments which allow the output of the amplifier 27 at the selected time to be stored on the selected segment capacitor $C_s$. The timing is controlled so that the value stored is equal to the peak value of the event signal coming from the amplifier 27. Thus, peak event signal amplitudes are stored in sequential order in the pipeline 29.

Readout of the values stored in the pipeline 29 is accomplished by means of a readout selector 33 controlled by the system controller 25, which selectively closes one m switch ($S_2$) and one m−1 switch ($S_3$) at a time to provide stored readout signals to a summing amplifier 35. The switches $S_2$ are connected between the ungrounded side of capacitors $C_s$ and the non-inverting (+) input of summing amplifier 35 and the switches $S_3$ are connected between the ungrounded side of capacitors $C_s$ and the inverting input (−) of amplifier 35 through a scaling network 37. The scaling network 37 may take the form of a voltage divider, as shown in FIG. 4, which provides the proper fraction K of the stored peak signal value corresponding to the event previous to event peak value being corrected to be applied to the inverting input of the summing amplifier 35 to provide the corrected event signal ($V_m$). The signals $V_m$ are recorded in a recording device 39 under control of the system controller 25.

Figure 5:
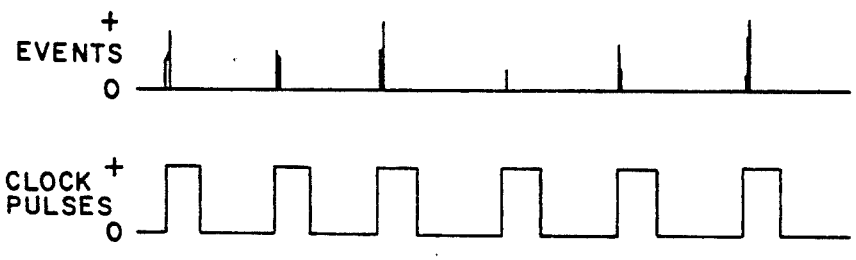
FIG. 5 is a timing diagram illustrating the synchronization of radiation events with the master controller clock pulses in the system of FIG. 4.

In operation, the system controller 25 is programmed to control the write and readout selectors 31 and 33 such that the peak values of the signals from the preamplifier 27 corresponding to detected events which are synchronized with the controller 25 generated clock pulses, as shown in FIG. 5, are stored sequentially in the pipeline 29 beginning with $Y_{m-n}$ through $Y_m$ and subsequently readout and applied to the summing amplifier 35.

During readout each adjacent stored value is compared with the previous stored value, with exception of the first $Y_{m-n}$, by selected readout to the summing amplifier and each stored value is corrected and the corrected value $V_m$ is stored in the storage device 39 under control of the system controller 25. Therefore, it will be seen that if pulse pile-up occurs, the stored value for each pulse is corrected prior to being recorded by subtracting the appropriate fraction of the value from the previous event signal based on the known signal response out of the preamplifier 27, as described above. This value is set by selecting the appropriate resistance values for the divider 37.

Figure 6:
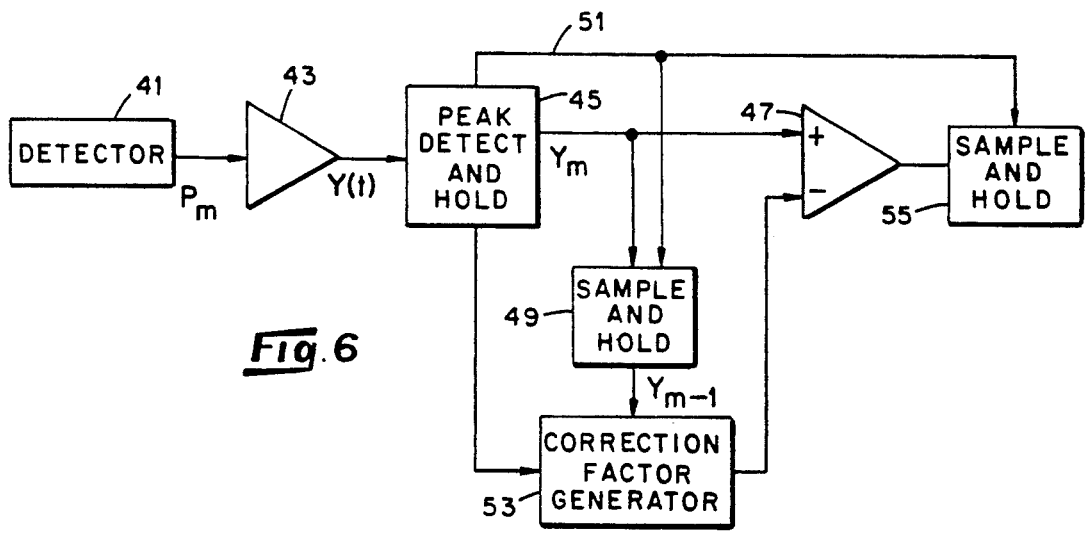
FIG. 6 is a block diagram of one embodiment of a pulse pile-up correction circuit according to the present invention for the detection of asynchronous radiation events.

Referring now to FIG. 6, there is shown a block diagram of a system for pulse pile-up correction for use in detecting radiation events in a non-synchronous system. In this application the correction factor applied to a present pulse being processed is calculated based on the time between detected events and the amplitude of the previous event signal. Event signals $P_m$ from a detector 41 are applied to the input of a preamplifier 43. The output of the amplifier 43 is connected to the input of a peak-detect and hold circuit 45 whose output is connected to the non-inverting input of a summing amplifier 47. In addition, the output of the peak-detect and hold circuit 45 is connected to a sample and hold circuit 49, which is controlled by the peak detector 45 to sample the detector 45 output each time a peak signal is detected. This sample is held until the next peak signal is detected by the detector 45, at which time an output (hold) line 51 is activated which is used to trigger the sample and hold circuit 49. The sampled signal value held by sample and hold 49 is fed to a correction factor generator 53 which generates a correction signal based on the pulse shape y(t), the time period since the last detected event and the peak detected amplitude held in sample and hold 49. The correction signal is triggered by means of a signal from the detector circuit 45. This correction signal is applied to the inverting input of summing amplifier 47. The output of summing amplifier 47 is connected to the input of a further sample and hold circuit 55 which is triggered to sample the summing amplifier output each time a new peak is detected, indicating the detection of a radiation event, by responding to the activating signal on the hold line 51 from the peak-detect and hold circuit 45. Thus, it will be seen that the held signal $V_m$ at the output of sample and hold 55 is the corrected event response signal which is directly proportional to the energy of the detected event.

Figure 7:
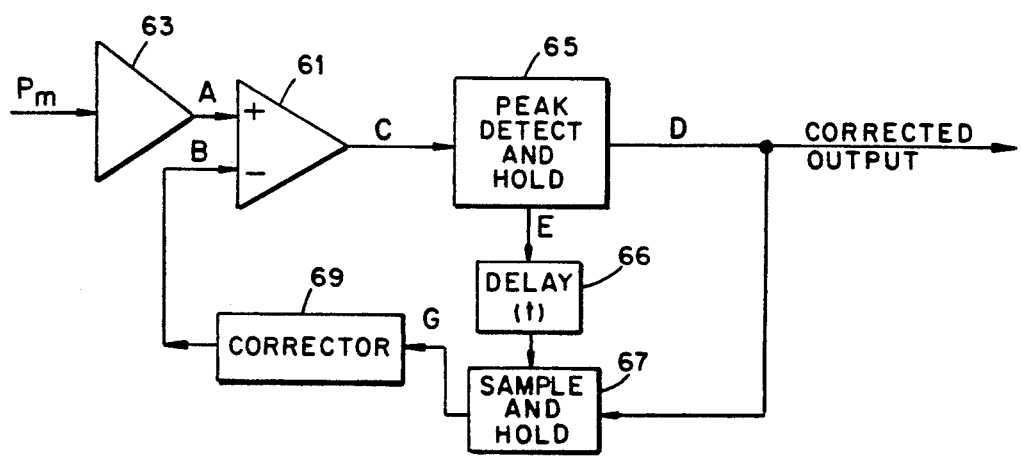
FIG. 7 is a block diagram of an alternate embodiment of a pulse pile-up up correction circuit according to the present invention for the detection of asynchronous radiation events.

Referring now to FIG. 7, wherein there is shown an alternate embodiment of a system for pulse pile-up correction for use in detecting radiation events in a non-synchronous system. In this application the correction factor applied to a present pulse being processed is generated continuously based on the amplitude of the previous signal and applied to the inverting input of a summing amplifier 61. The event signal $P_m$ is applied to the non-inverting input of amplifier 61 through a preamplifier 63, which provides the shaped pulse response to a detected event as in the previously explained examples. The output of the summing amplifier 61 is connected to the input of a peak-detect and hold circuit 65. The held peak values are stored in a sample and hold circuit 67 which is activated following each sensed peak by a control signal generated by a delay circuit 66 at a time t following the change in state of the detector 65 from the track to the hold state, which is available at the output E of the detector 65. A correction signal generator 69, which may take the form of a circuit essentially the same as the preamplifier with an impulse generator added, is connected between sample and hold 67 and the inverting input of amplifier 61 to provide a continuous correction factor based on the corrected amplitude of the last detected pulse, as will be explained herein below.

Figure 8:
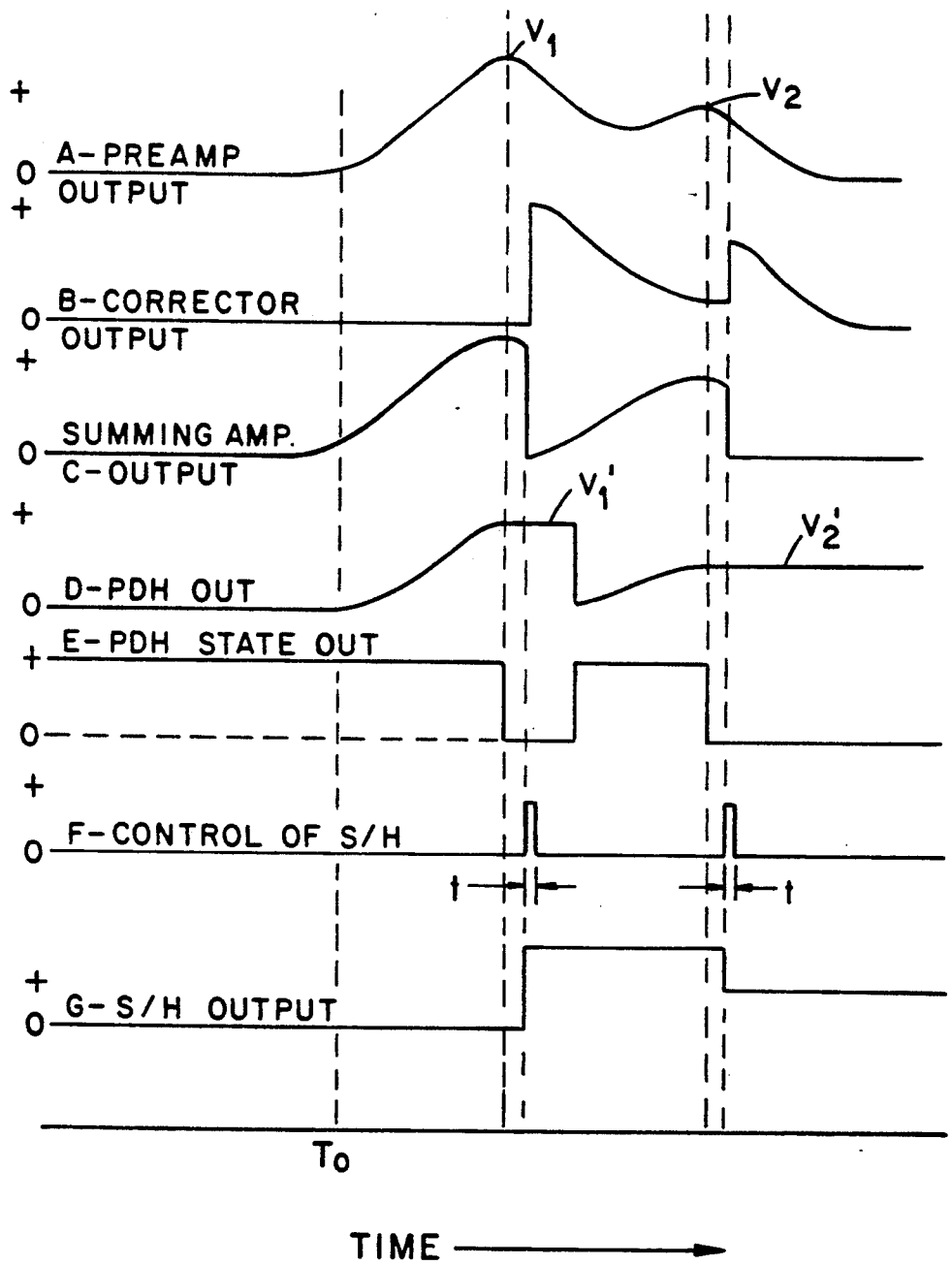
FIG. 8 is a timing diagram of the various signals of the circuit of FIG. 7 as indicated by the like reference characters.

In this embodiment, the correction factor is generated by multiplying the amplitude of the sample and hold 67 output by a reference signal which has a decay rate identical to the shaped pulse decay from the output of amplifier 63, which is fixed by the design of the preamplifier circuit. As shown in FIG. 8, wherein the signals for various outputs of the circuit of FIG. 7 are shown by like reference characters, detected events generate shaped pulse outputs from the preamplifier 63, here illustrated by peaks $V_1$ and $V_2$ in a pulse pile-up condition (A). The A signal is applied to summing amplifier 61 wherein the output of corrector 69 (B) is subtracted from signal A leaving the output C, which is applied to the input of the peak-detect and hold circuit 65. Each peak is detected and the output D is held following each peak. These held signals are the corrected peak values for the detected events $V_1'$ and $V_2'$, as indicated. When the first peak is detected, the peak-detect and hold 65 switches from the track to the hold mode for a period sufficient to allow a recording means to record the corrected value at the D output. Further, the output E is fed to the delay circuit 66 which generates a short duration trigger pulse after a delay t on the F output line which lasts for a period sufficient to trigger the sample and hold 67 to store the peak value $V_1'$. This value is multiplied by the decaying signal in the corrector circuit 69 to generate the output correction signal B. Thus, when the signal peak $V_2$ is sensed by the peak-detect and hold 65, the amplitude has been corrected and the new peak value $V_2'$ is the corrected peak value in that the remaining response due to peak $V_1$ has been subtracted from the $V_2$ response riding on the $V_1$ response. Each time a new peak is detected the corrector circuit response is restarted and a new correction factor B is available to be applied to the next detected pulse. If no event is detected which overlaps the previous response, i.e. no pulse pile-up, the output of the corrector circuit drops to zero and the new peak response is recorded directly without correction, as in the case of response $V_1$ above.

Thus, it will be seen that a radiation detection method and system for continuously correcting the quantization of detected charge during pulse pile-up conditions has been provided. Although the invention has been described by means of description of preferred embodiments of the present invention, those skilled in the art will recognize that various modifications and changes may be made therein without departing from the spirit and scope of the invention as set forth in the following claims attached to and forming a part of this specification.

We claim:

1. A radiation detection method for continuously correcting the quantization of detected charge in a radiation detection system during pulse pile-up conditions, comprising the steps of:

continuously converting radiation event pulses from a radiation detector to voltage pulses of a predetermined shape whose peak amplitudes are proportional to the quantity of charge of each corresponding detected event;

sampling and storing the peak amplitudes of each of said voltage pulses in accordance with their respective times of occurrence;

generating a correction factor signal for each of said voltage pulses based on the known response of said predetermined shape pulses whose amplitude represents a fraction of a previous pulse's amplitude corresponding to the previous pulse's influence on a following pulse's peak amplitude at the time of occurrence of said following pulse; and, subtracting said correction factor signal amplitude from said following pulse peak amplitude to obtain a corrected amplitude signal indicative of the charge quantity of the radiation event corresponding to said following pulse peak.

2. A radiation detection method as set forth in claim 1 wherein said radiation events occur at a known fixed rate and said correction factor generating step includes dividing each of said previous pulse's stored peak amplitudes by a constant factor dependent upon the period of the known rate of occurrence of said radiation events.

3. A radiation detection method as set forth in claim 1 wherein said radiation events occur at random and wherein said correction factor generating step includes sampling and holding said corrected amplitude signal corresponding to said previous pulse and multiplying the held signal by a decaying function corresponding to the rate of decay of said predetermined pulse shape of said voltage signals to provide a continuously varying correction factor signal.

4. A radiation detection method as set forth in claim 1 wherein said radiation events occur at random and wherein said correction factor generating step includes sampling and holding the peak amplitude of each voltage pulse for a period greater that the period between each successive voltage pulse and calculating a correction factor signal based on the time period between successive pulses and the stored amplitude of said voltage signal corresponding to the previous voltage pulse.

5. A radiation detection system for continuously correcting the quantization of detected charge in a radiation detection system during pulse pile-up conditions, comprising:

a radiation detecting means for detecting and generating event pulses in response to ionizing radiation events whose charge is to be quantized;

pulse amplifying means for converting said radiation event pulses to voltage pulses of a predetermined shape whose peak amplitudes are proportional to the quantity of charge of each corresponding detected radiation event;

sampling and storing means for sampling and storing the peak amplitudes of each of said voltage pulses;

a correction factor signal generating means for generating a correction factor signal for each of said voltage pulses based on the known response of said predetermined shape pulses whose amplitude represents a fraction of a previous pulse's amplitude corresponding to the previous pulse's influence on a following pulse's peak amplitude at the time of occurrence of said following pulse; and, summing amplified means for subtracting and correction factor signal amplitude from said following pulse peak amplitude to obtain a corrected amplitude signal indicative of the charge quantity of the radiation event corresponding to said following pulse peak.

6. The radiation detection system as set forth in claim 5, wherein said ionizing radiation events occur at a known fixed rate and wherein said sampling and storing means includes means for sequentially storing said peak amplitudes of said voltage pulses in separate adjacent storage segments therein and said correction factor signal generating means includes a switching means for selectively applying and sequentially stored peak amplitudes to a non-inverting (+) input of said summing amplifier means while applying said fraction of an adjacent one of said sequentially stored peak amplitudes corresponding to said previous pulse's peak amplitude to an inverting (−) input of said summing amplifier.

7. The radiation detection system as set forth in claim 5, wherein said ionizing radiation events occur at random and wherein said sampling and storing means and said correction factor signal generating means includes a peak detector and hold circuit means responsive to peak amplitudes of said voltage pulses for detecting and holding the peak amplitude signal at an output thereof of each of said voltage pulses and applying said peak amplitude signal to a non-inverting (+) input of said summing amplifier a sample and hold circuit means responsive to the output of said peak detector for sampling and holding the peak amplitude of a previous pulse's voltage signal at the output of said peak detect and hold circuit means during the application of the following pulse's voltage signal applied to said +input of said summing amplifier and a correction signal generator means for generating and applying said correction factor to an inverting (−) input of said summing amplified based on the pulse shape of said voltage pulses, the peak amplitude of said previous pulse's voltage signal at the output of said sample and hold circuit means and the time period since the last detected radiation event.

8. The radiation detection system as set forth in claim 5, wherein said ionizing radiation events occur at random and wherein said sampling and storing means and said correction factor signal generating means includes a peak-detect and hold circuit means connected to the output of said summing amplifier, said summing amplifier having a non-inverting (+) input connected to the output of said pulse amplifying means and an inverting (−) input, a correction signal generating means for generating and applying said correction factor to said inverting input of said summing amplified based on the decay rate of said voltage signals and the peak amplitude of said voltage pulse corresponding to the last detected event, and a sample and hold circuit means connected between the output of said peak-detect and hold circuit means and an input of said correction signal generating means for sampling and applying the peak voltage signal from said peak detect and hold circuit means to said correction factor generating means corresponding to said last detected event for a selected time after the occupance of a following detected event.

* * * * *